G. A. BALZ.
REFRACTORY BRICK.
APPLICATION FILED FEB. 19, 1918.

1,410,729.

Patented Mar. 28, 1922.

WITNESS:
René Buine

INVENTOR
George A. Balz,
By Attorneys,
Fraser, Dunk & Myers

UNITED STATES PATENT OFFICE.

GEORGE A. BALZ, OF RAHWAY, NEW JERSEY.

REFRACTORY BRICK.

1,410,729. Specification of Letters Patent. Patented Mar. 28, 1922.

Application filed February 19, 1918. Serial No. 218,164.

*To all whom it may concern:*

Be it known that I, GEORGE A. BALZ, a citizen of the United States of America, residing in Rahway, in the county of Union and State of New Jersey, have invented certain new and useful Improvements in Refractory Bricks, of which the following is a specification.

This invention relates to bricks, including tiles, slabs, or other form of subdivided refractory lining for furnaces.

In certain types of furnaces, particularly those for metallurgical use, it is desirable to have the lining bricks or tiles faced with a material of different chemical or physical characteristics from the refractory material which is most desirable as the body of the brick or tile. In such cases it has been proposed to face the brick with a somewhat thin facing layer of a refractory material having the desired properties, such facing layer being joined to the back or body of the brick by cohesion resulting from the fusion of one or other or both of the materials, or of an intervening cementitious layer. For example, chrome ore, or other refractory as magnesite, has been thus used as the facing for a brick, the body of which is of fire-clay or silica brick.

A difficulty in efforts to thus combine two dissimilar refractories is that incident to their varying coefficients of expansion under heat, which as the brick is heated tends to sever any union which is accomplished merely by cementitious action or cohesion. A further difficulty is in the liability to transverse or other fracture of the facing which is liable to occur when the body portion has a greater coefficient of expansion than the facing material, and especially when the service temperature of the furnace is less than that at which the cementitious action of the bonding material is effective. If the bond between the facing and the body material is sufficiently rigid at the temperature of operation to firmly hold the facing to the body, and hence of greater cohesion than the bonding of the individual particles comprising the facing material, a fracture or fractures across the facing material will occur. Another difficulty is that if the service temperature is greater than the temperature at which the cementitious action of the bonding material is effected, the facing material is liable to separate from the body.

The present invention is designed to provide a refractory brick having a body of one material and a facing of another which shall not be liable to any tendency to the severance or fracture of the respective portions, due to their varying coefficients of expansion or varying conditions of cementitious or bonding effect.

To this end my invention provides a refractory brick having a facing of different material than the body, such facing being united to the body by purely mechanical means, such as by a dovetailed connection, and without the use of cement or mortar. More specifically, such connection is made by constructing one part of the brick to overhang or embrace the other in such manner that the member having the greater coefficient of expansion shall be the one between portions of which the other member is embraced, so that when expansion occurs, its effect is merely to slightly loosen the connection, but without any fracturing tendency upon either member.

The preferred embodiment of the invention involves the dovetailing together of the respective members of the brick. It is proposed, for example, to make a brick, the body of which is of ordinary fire-clay, or other refractory, and the face of which is of silicon carbide, or so-called carborundum. The dovetailed joint extends preferably for the length of the brick. The two members of the brick are preferably separately moulded and baked, and are then united by sliding their dovetailed portions into engagement, the dovetailed surfaces being a sufficiently loose fit to enable this to be readily accomplished.

In the accompanying drawings,—

Figure 1:
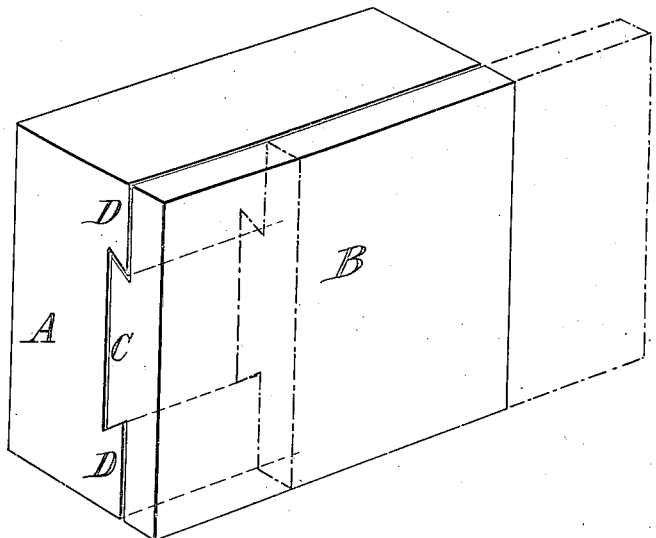
Figure 1 is a perspective view of a preferred form of brick, embodying the invention.

In the drawings, A designates the body of the brick and B the face or facing thereof. The body may, for example, be of silica brick or fire-clay, or other suitable refractory. The facing B may be of carborundum, chrome, or other suitable refractory. The particular material for each member of the brick will be chosen in each case according to the requirements of the metallurgic or other furnace in which the bricks are to be used.

Figure 2:
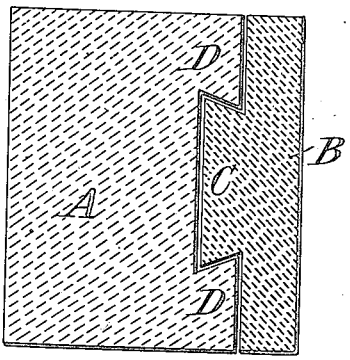
Fig. 2 is a transverse section.

The preferred construction for uniting the two members is by means of a dovetail, as shown for example in Figs. 1 and 2. In this instance the dovetail consists of a middle key or feather C formed integral with the facing, and lateral or embracing portions D D formed integral with the body A. Owing to the inevitable irregularly of the refractory materials used for such bricks, it is best to leave the dovetailed joint somewhat loose, as shown. In the drawing, the dovetailed faces are shown as extending longitudinally of the brick, the latter being shown as formed as usual with a greater length than width; but any other direction of the dovetail may be chosen as conditions may render preferable.

The best way to construct these new composite bricks is to mould each member separately, then to bake or fire each member separately; then to combine them by sliding their dovetailed surfaces together. The looseness of the dovetailed fit facilitates the operation of thus combining them. This operation is shown in dotted lines in Fig. 1, where the facing B is illustrated as only partially slid into place on the body. The invention may be realized, however, by other modes of manufacture, as by first moulding separately the two members of the brick and drying them, then uniting them, and then baking or firing the combined brick. Or one member may be first moulded and fired, and then placed in a mould in which the other member is moulded after which the composite brick is dried, and, if necessary, refired. But in any case the two members are united by merely mechanical engagement and not by cohesion or adhesion, or by an interposed cement.

The construction shown in Figs. 1 and 2 is best adapted to a brick in which the body A has a greater coefficient of expansion than the facing B, and when put into the furnace and subjected to heat the superposed bodies expand faster than the superposed facings, and consequently relieve the latter of load. Further, with respect to each brick, while the two members expand together and thereby maintain approximately the same looseness of fit as when cold, yet the greater coefficient of expansion of the body insures that the effect of heat shall be to slightly but imperceptibly separate the embracing portions D D, so that the dovetailed joint becomes slightly, but imperceptibly, looser than when cold. This insures that there shall be no fracturing of the dovetailed members, due to expansion by heat.

Figure 3:
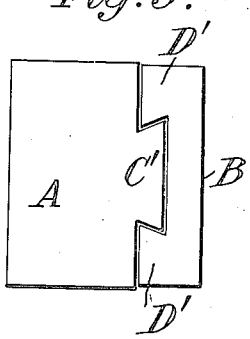
Fig. 3 is an end view of a modified construction.

In the form shown in Fig. 3, the dovetail is reversed, the embracing members here lettered D' D' being formed on the facing member B, and the intervening dovetail, here lettered C', being formed on the body member A. This construction is best suited for bricks in which the material of the facing B has a greater coefficient of expansion than that of the body A. With such bricks, when laid up in the furnace, there would be the disadvantage that the superposed facings would tend on expanding to take the weight off from the body portions. This may be avoided by confining the mortar joints to the body portion. For such bricks it is also advantageous to make the facings somewhat narrower than the body portions, as shown.

Figure 4:
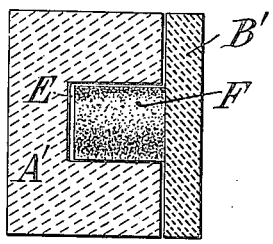
Fig. 4 is a similar transverse section, illustrating a further modification.

The invention is not necessarily limited to an interlocking engagement between the members A and B in the nature of a dovetail. That is to say, the union of the two members may be effected without the one having an undercut engagement with the other. Thus, for example, a mechanical engagement of the mortise and tenon type may be applied without departing from the more generic features of my invention. An example of such construction is shown in Fig. 4, where the body A' is formed with a mortise E and the facing B' is formed with a tenon F. In such case the mortise and tenon should be made to fit closely enough to afford the requisite friction for holding the two members in engagement.

It has heretofore been necessary in order to make refractory bricks having a facing of different material from the body, to either unite the two parts by cement or mortar, or by flux, or to unite them while at least one member is in plastic condition, and in such case to bake or fire the combined brick while maintaining such pressure as to hold the two members in cohesive contact during firing. The disadvantage of these operations is overcome by the present invention.

The present invention is not limited to the use of materials for the body and facing having different coefficients of expansion, as it has advantages even in case the two materials tend to expand and contract at the same rate. Nor does the invention exclude the use of materials which have a negative coefficient of expansion with heat. In case of any dissimilar materials, whatever be their relative action in heating or cooling, the invention has the advantage of eliminating all disastrous or destructive tendencies due to temperature differences. Thus the invention eliminates the difficulties heretofore encountered by reason of the varying rigidity and varying bonding effect of cementitious material as heretofore used for uniting the facing to the body.

In this specification and the claims the term "brick" is used in a broad sense, to cover any shape of block, slab, tile, or other form of sectional or segmental refractory furnace lining.

I claim as my invention:—

1. A refractory brick consisting of a body portion and a facing portion relatively shaped to mechanically engage one another and united only by such engagement.

2. A refractory brick comprising a body portion and a facing portion united solely by mechanical engagement, the one having a recess and the other having a projection entering such recess for mechanically uniting such portions.

3. A refractory brick comprising a body portion and a facing portion united solely by mechanical engagement, having reciprocally engaging undercut portions for uniting them.

4. A refractory brick comprising a body portion and a facing portion united solely by mechanical engagement, formed respectively with reciprocally engaging portions constituting a dovetail for uniting them.

5. A refractory brick of elongated shape, comprising a body portion and a facing portion united solely by mechanical engagement, formed respectively with longitudinal engaging portions constituting a dovetail for uniting them.

6. A refractory brick comprising a body portion and a facing portion, united solely by an embracing engagement, the one portion formed with engaging members embracing between them the member on the other portion.

7. A refractory brick comprising a body portion and a facing portion, of materials having different coefficients of expansion, united solely by an embracing engagement, the portion having the greater expansion formed with engaging members embracing between them the member on the portion having the lesser expansion, whereby when heated the engaging joint tends to open.

In witness whereof, I have hereunto signed my name.

GEORGE A. BALZ